US007562535B2

(12) United States Patent  
Deiml et al.

(10) Patent No.: US 7,562,535 B2
(45) Date of Patent: Jul. 21, 2009

(54) METHOD FOR THE AUTOMATIC STARTING AND STOPPING OF AN INTERNAL COMBUSTION ENGINE

(75) Inventors: Mathias Deiml, Donaustauf (DE); Frank Lohrenz, Lappersdorf (DE); Martin Rampeltshammer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 383 days.

(21) Appl. No.: 10/583,338

(22) PCT Filed: Nov. 30, 2004

(86) PCT No.: PCT/EP2004/053184

§ 371 (c)(1),
(2), (4) Date: Jul. 17, 2006

(87) PCT Pub. No.: WO2005/059354

PCT Pub. Date: Jun. 30, 2005

(65) Prior Publication Data

US 2007/0107455 A1    May 17, 2007

(30) Foreign Application Priority Data

Dec. 18, 2003    (DE)    ................. 103 59 672

(51) Int. Cl.
*B60H 1/32*    (2006.01)

(52) U.S. Cl. .......................... 62/115; 62/228.1; 62/236; 123/179.4; 701/112

(58) Field of Classification Search .................. 62/133, 62/236, 228.1, 228.5, 244, 114; 165/205; 123/179.3–179.4; 180/65.2–65.3; 701/112–113
See application file for complete search history.

(56) References Cited

U.S. PATENT DOCUMENTS

| 6,644,055 | B2 | 11/2003 | Ohta et al. |
| 6,895,917 | B2 * | 5/2005 | Itoh et al. ................. 123/179.4 |
| 6,978,634 | B2 * | 12/2005 | Aoki ............................ 62/244 |

FOREIGN PATENT DOCUMENTS

| DE | 32 28 561 A1 | 2/1983 |
| DE | 102 11 461 C1 | 7/2003 |
| DE | 102 11 466 C1 | 8/2003 |
| JP | 2000-179374 | 6/2000 |
| WO | WO 02/063163 A1 | 8/2002 |

* cited by examiner

*Primary Examiner*—William E Tapolcai
(74) *Attorney, Agent, or Firm*—Laurence A. Greenberg; Werner H. Stemer; Realph E. Locher

(57) ABSTRACT

The invention relates to a method for the automatic starting and stopping of an internal combustion engine. Release of a stop mode for the internal combustion engine is enabled depending on a time period that depends on the temperature difference between the temperature prevailing in the interior of a motor vehicle and the desired temperature set by the driver.

6 Claims, 3 Drawing Sheets

METHOD FOR THE AUTOMATIC STARTING AND STOPPING OF AN INTERNAL COMBUSTION ENGINE

BACKGROUND OF THE INVENTION

FIELD OF THE INVENTION

The invention relates to a method for the automatic starting and stopping of an internal combustion engine of a motor vehicle by means of a start-stop device, by means of which the internal combustion engine, having been started by a person is switched off automatically depending on multiple stop conditions. One of the stop conditions is the release of the stop mode of an air-conditioning device depending among other things on a temperature prevailing in the interior of the motor vehicle and a further stop condition is the expiration of a defined variable time period.

Such a method is known from DE 102 11 461 C1. There, it is proposed that, after the internal combustion engine has been started by a driver, said engine be stopped automatically depending on multiple stop conditions. One of these stop conditions is the release of the stop mode of an air-conditioning device, its release being in turn dependent on, among other things, a temperature measured in the interior of the motor vehicle. The condition in respect of the value of this measured temperature is that it lie within an acceptable tolerance range.

A further stop condition, which must be present as an AND function linked to the other stop conditions, is a variable delay period which delays the release of the stop mode, i.e. the switching off of the internal combustion engine. This is designed to prevent unwanted automatic switching off e.g. when maneuvering or when stopping briefly to turn in the face of oncoming traffic.

In vehicles fitted with automatic start-stop technology, there is always the problem that when the internal combustion engine is switched off the air-conditioning system cannot be operated, as the air-conditioning compressor in the auxiliary unit drive is also not running. As a solution to this problem, the internal combustion engine could, where there is a request for air-conditioning, not be switched off at all, but this has disadvantages in terms of fuel consumption. Similarly, it would be possible to disconnect the air-conditioning compressor from the usual auxiliary unit drive and to drive it separately electrically, but this is cost-intensive and can place excessive strain on the vehicle electrical system. The electrical drive could in this case also be a starter-generator that drives the auxiliary units via a belt, a clutch then being necessary between crankshaft and auxiliary unit drive.

SUMMARY OF THE INVENTION

Against this background, the object of the invention is therefore to indicate a method that provides a favorable (in terms of fuel consumption) mode of operation for the start-stop operation of an internal combustion engine, while at the same time being more convenient for the driver.

Accordingly, the invention relates to a method for automatically starting and stopping an internal combustion engine of a motor vehicle by means of a start-stop device, by means of which the internal combustion engine, having been started by a driver, is switched off automatically depending on multiple stop conditions, one of the stop conditions being the release of the stop mode of an air-conditioning device depending on, among other things, a temperature prevailing in the interior of the vehicle, and a further stop condition being the expiration of a defined variable time period, this time period depending on the temperature difference between the temperature prevailing in the interior and the target temperature desired by the driver.

A further feature of the invention is characterized in that the time period depends on the air-conditioning performance of the air-conditioning device, that is e.g. on the cooling performance of the air-conditioning compressor.

Moreover, it is advantageous if this time period depends on the relative air-conditioning performance, this relative air-conditioning performance being the quotient of the air-conditioning performance of the air-conditioning device and the temperature difference.

In another embodiment of the invention, it can be provided that the end of the specified time period depends on a basic value of a threshold value, this basic value being read out from an engine characteristics map depending on the relative air-conditioning performance. An engine characteristics map is in this context optionally also understood to be just a single curve trace that reproduces the course of one variable depending on another variable.

A further feature of the invention is characterized in that the threshold value is calculated from a link between the basic value and a learning factor, the learning factor representing a driver-specific manner of driving.

In addition, it is advantageous if, when air conditioning is requested by the driver and the internal combustion engine is not running, this air conditioning request starts a timer that sets a start time of the time period, and the end of the time period is determined by a comparison of the current value of the timer with the threshold value, whose value is dependent on the temperature difference. It can be provided here that the starting of the timer sets a logic marker.

It is also an integral part of the invention that, when there is a request for air conditioning by the driver and the internal combustion engine is running, the value of the timer is compared incrementally with the threshold value, and where the threshold value is exceeded by the current value of the timer, release of the stop mode of the air-conditioning device is enabled.

Use of the method according to the invention advantageously dispenses fully with the need for additional mechanical components for solving the problem indicated. The procedures provided provide rather for modeling of the operating behavior of the air-conditioning device and of the temperature measured and/or calculated in the interior of the vehicle.

The methodological procedure according to the invention determines to this end whether stopping of the internal combustion engine at the time desired by the driver is possible from an air-conditioning point of view. Only if too great a temperature difference prevails is a release of stop mode not granted, rather the internal combustion engine then continues to run for a defined period until this temperature difference has reached a value that ensures that the interior feels comfortable for the driver.

The proposed method permits in an analogous manner control of an air-conditioning-related restart of the internal combustion engine.

The method according to the invention uses at least one interior temperature T_ist, which is measured or calculated in accordance with a temperature model.

A physical/mathematical temperature model of the vehicle interior is preferably used for calculating the interior temperature T_ist, which model takes into account a plurality of variables which represent the inflow and outflow of heat energy in the vehicle interior under different vehicle operating conditions.

The variables taken into account by the temperature model include for example the geometry and the size of the vehicle interior, its thermal insulation properties, the surface area of the windows, the number and electrical rating of electrical consumers located in the vehicle interior which are switched on, the thermal input from solar irradiation and the thermal input from an interior heating and ventilation device.

Finally, it can be provided that multiple interior-related target temperatures (T_soll) and interior temperatures (T_ist) are determined or taken into account when the method is implemented.

To illustrate the invention, enclosed with the description are drawings, with the aid of which an exemplary embodiment, together with further features and advantages, is explained in detail below, and in which:

DESCRIPTION OF THE PREFERRED EMBODIMENTS

Figure 1:
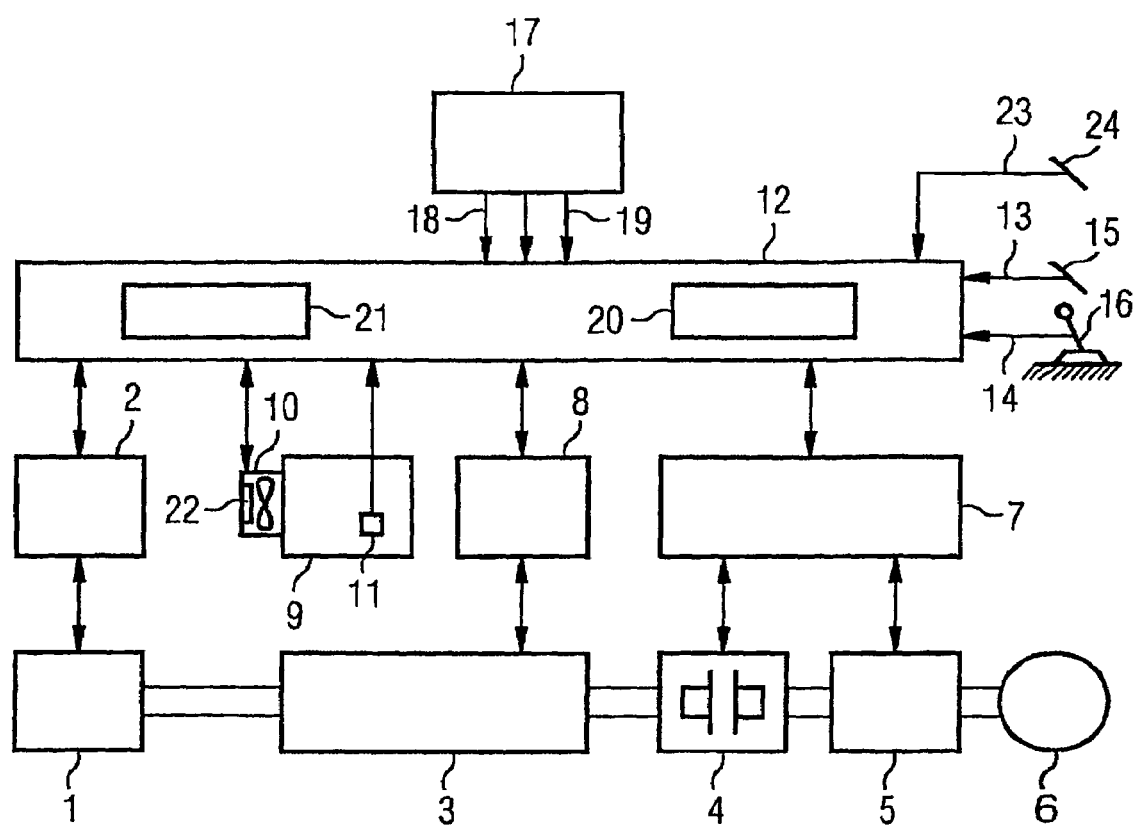
FIG. 1 shows a schematic overview of the system according to the invention.

A drive train of a motor vehicle has an internal combustion engine 1 to which an electronic engine control unit 2 is assigned. The crankshaft of the internal combustion engine 1 is connected either directly or via a belt to a starter-generator 3, and is also connected via a clutch 4 to a gear unit 5 which acts upon the wheels 6 of the motor vehicle.

The clutch 4 can be a friction clutch or a converter-bypass clutch. A shared control unit 7 is assigned to the clutch 4 and the gear unit 5 and a control unit 8 to the starter-generator 3.

An air-conditioning device 10 is assigned to an interior 9 of the motor vehicle, which air-conditioning device comprises among other things an air conditioner 22 and a blower. A temperature sensor 11 in the interior 9 records the temperature T_ist currently prevailing in the interior 9.

A system-wide drive train management system 12 processes a plurality of incoming information items and also forwards a plurality of signals and/or information items to various components. In this way it receives via lines 13, 14 and 23 sensor signals which transmit the wishes of the driver with regard to actuation of an accelerator pedal 15, a gear selection lever 16 and a brake pedal 24. Further signals are fed to the drive train management system 12 from sensors or regulating units combined under a single symbol into a block 17. For example, a signal is transmitted via a line 18 which transmits the switching-off or switching-on request made by the driver with regard to the air-conditioning device 10. A further line 19 transmits the target temperature value T_soll for the interior 9 input by the driver personally via a corresponding operator panel.

The control units 2, 7 and 8 can be combined with one another and/or be an integral component of the drive train management system 12; equally, said drive train management system can be distributed between the control units 2, 7 and 8.

Forming part of the drive train management system 12 are a start-stop device 20 and an evaluation circuit 21. Inside the start-stop device 20, among other things a program is executed which is explained in detail in connection with FIG. 2. The evaluation circuit 21 contains a program which is explained in detail in connection with FIG. 3.

The drive train management system 12 ensures that, depending on defined conditions, the internal combustion engine 1 is stopped or started in an automatic manner, without the person driving the vehicle having to intervene separately for this purpose. One of the conditions which has to be complied with in order for the start-stop device 20 of the drive train management system 12 to permit stopping is the release of this start-stop mode by the air-conditioning device 10.

The program running in the start-stop device will now be explained with the aid of the flow diagram in FIG. 2.

In a step S1, the request of the driver with regard to the switching on of the air-conditioning device 10, which is transmitted via the line 18, is input. In the event that operation of the air conditioner is not desired, in a step S2 a resettable time counter (timer T1), to be explained later, is reset in a step S3 via the output "no". Moreover, the immediate release of the start-stop mode for the internal combustion engine 1 is effected in a step S4, provided also that the other conditions for this, which will not be explained in detail here, are fulfilled.

If in step S2 operation of the air conditioner is desired (output "yes"), then in a step S5 it is determined whether the start-stop device 20 is currently active, that is, the internal combustion engine 1 is switched off. If this is the case (output "yes"), then in a step S6 a query is made as to whether a marker M1 has already been set. If this is not the case (output "no"), then in step S7 the timer T1 is started and in a step S8 the marker M1 is set.

The timer T1 gives the time since the last activation event, that is, since the air-conditioning device 10 was switched on by the driver or by starting the internal combustion engine 1. The start time of the timer T1 defines here a start time of a time window delta_t, which is open until such time as the timer T1 is stopped.

The marker M1 is a logical state variable, which is reset when the air-conditioning device 10 is switched off by the driver or when the internal combustion engine 1 is started.

If in step S6 the marker M1 was already set, i.e. output "yes" from step S6, then release of the start-stop mode by the air-conditioning device 10 is granted in step S4.

If the marker M1 was set in step S8, then in a step S9 the current value of the timer T1 is compared with a threshold value SW.

Determination of this threshold value (SW) will be explained in detail later in connection with FIG. 2.

If in step S9 the value of T1 lies above the threshold value SW (output "yes") then in step S3, the timer T1 is reset to the value zero and release granted in step S4. If it lies below the threshold value SW, output "no" from step S9, then start-stop mode is blocked in a step S10.

In the event that the start-stop device 20 is currently not active, i.e. the internal combustion engine 1 is running, a query is made in step S1, via the output "no" from step S5, as to whether the timer T1 has already started. If this is not the case (output "no"), then further execution of the program takes place with the aid of the previously explained steps S6, S7, S8 and S9.

If the timer T1 should already have started, output "yes" from step S11, then the value of the timer T1 is incremented in a step S12 and each increment is then compared in the previously explained step S9 with the threshold value SW.

The method described previously is executed e.g. in a time cycle of 10 milliseconds and the logical release variable which is output as a result via step S4 or S10 is transferred to the drive train management system 12.

Figure 3:
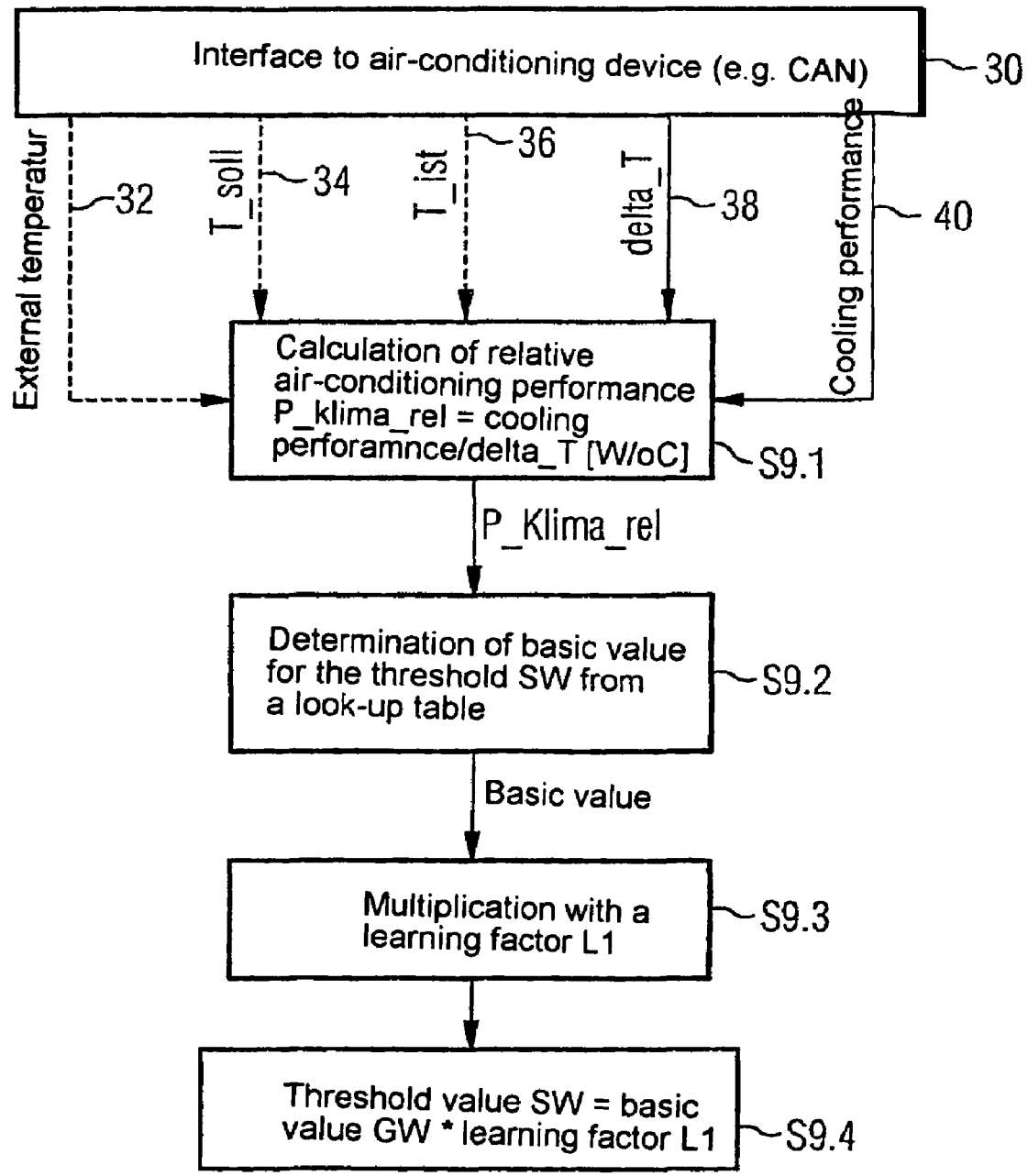
FIG. 3 shows the flow diagram of a further program which determines a value that is processed in the program according to FIG. 2.

Determination of the threshold value SW will be explained in detail below with the aid of FIG. 3.

The air-conditioning device 10 makes various items of information available via an interface 30 of a CAN bus. For example, via paths 32, 34, 36, 38 and 40 the value of the external temperature currently recorded via a sensor (not shown), the target temperature value for the interior of the vehicle T_soll input by the driver via an operator panel in the interior 9, the current actual temperature value T_ist in the interior 9 determined via the sensor 11, the difference delta_T of these two stated temperature values (T_soll less T_ist), and the adjusted performance of the air-conditioning device 10, i.e. the cooling or heating performance, are transferred to a step S9.1.

In this step S9.1, a relative air-conditioning performances p_klima_rel is calculated with the aid of the existing information as a quotient from the value of the cooling performance in watts and the temperature difference delta_T in degrees Celsius. The value of this relative cooling performance P_klima_rel is fed in a step S9.2 to an engine characteristics map which, depending on this value, reads out basic values GW in seconds. Some typical value pairs from this engine characteristics map, which can consist of a so-called look-up table, are given by way of example in the table below:

| P_klima_rel (Watts/degrees Celsius) | Basic value GW (seconds) |
|---|---|
| −500 | |
| −120 | 60 |
| −200 | 30 |
| −100 | 0 |
| 0 | 30 |
| 100 | 60 |
| 200 | 120 |
| 500 | |

In a step S9.3, this basic value GW is then linked multiplicatively with a learning factor L1. This learning factor L1 can assume values between zero and one and enables adaptation of vehicle behavior to particular driver requests and driving methods.

Figure 2:
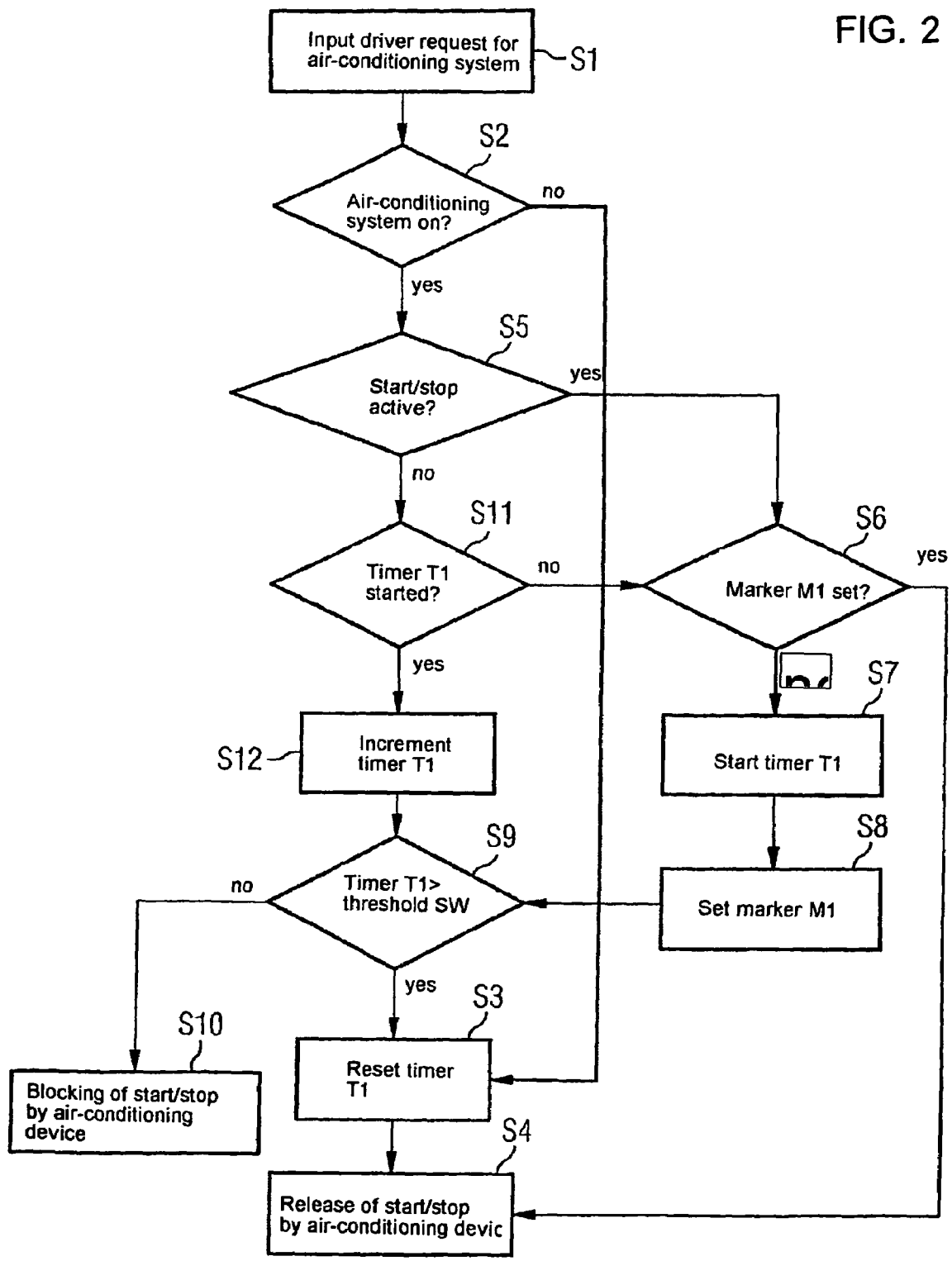
FIG. 2 shows the flow diagram of a program which is executed in the system overview according to FIG. 1.

Finally, in a step S9.4, the threshold value SW is output as a mathematical product of the basic value GW and the learning factor L1 and transferred to step S9, which is explained with the aid of FIG. 2.

We claim:

1. A method for automatically starting and stopping an internal combustion engine of a motor vehicle having an air conditioning system, by way of a start-stop device, the method which comprises:
   automatically switching off the internal combustion engine, having been started by a person, with the start-stop device in dependence on multiple stop conditions, wherein one of the stop conditions is a release of a stop mode of an air-conditioning device depending, inter alia, on an actual temperature prevailing in an interior of the motor vehicle, and a further stop condition is an expiration of a defined variable time period, and the variable time period depends on a temperature difference between the actual temperature prevailing in the interior of the motor vehicle and a setpoint temperature desired by the driver;
   wherein the time period depends on a relative air-conditioning performance defined as a quotient of the air-conditioning performance of the air-conditioning device and the temperature difference; and
   calculating a threshold value from a link between the basic value and a learning factor representing a driver-specific manner of driving.

2. A method for automatically starting and stopping an internal combustion engine of a motor vehicle having an air conditioning system, by way of a start-stop device, the method which comprises:
   automatically switching off the internal combustion engine, having been started by a person, with the start-stop device in dependence on multiple stop conditions, wherein one of the stop conditions is a release of a stop mode of an air-conditioning device depending, inter alia, on an actual temperature prevailing in an interior of the motor vehicle, and a further stop condition is an expiration of a defined variable time period, and the variable time period depends on a temperature difference between the actual temperature prevailing in the interior of the motor vehicle and a setpoint temperature desired by the driver; and
   wherein, when an air conditioning request is made by the driver and the internal combustion engine is not running, starting a timer to set a start time of the time period, and determining an end of the time period by comparing a current value of the timer with the threshold value, with the threshold value depending on the temperature difference.

3. The method according to claim 2, wherein the starting of the timer sets a logic marker.

4. The method according to claim 3, wherein, when an air conditioning request is made by the driver and the internal combustion engine is running, incrementally comparing the value of the timer with the threshold value, and when the threshold value is exceeded by a current value of the timer, enabling a release of the stop mode of the air-conditioning device.

5. A method for automatically starting and stopping an internal combustion engine of a motor vehicle having an air conditioning system, by way of a start-stop device, the method which comprises:
   automatically switching off the internal combustion engine, having been started by a person, with the start-stop device in dependence on multiple stop conditions, wherein one of the stop conditions is a release of a stop mode of an air-conditioning device depending, inter alia, on an actual temperature prevailing in an interior of the motor vehicle, and a further stop condition is an expiration of a defined variable time period, and the variable time period depends on a temperature difference between the actual temperature prevailing in the interior of the motor vehicle and a setpoint temperature desired by the driver;
   calculating the actual temperature in the interior with a physical/mathematical temperature model of the vehicle interior, the model taking into account a plurality of variables representing an inflow and an outflow of heat energy under different operating conditions of the vehicle.

6. The method according to claim 5, wherein the variables of the temperature model include a geometry and a size of the vehicle interior, thermal insulation properties of the vehicle, a surface area of windows, a number and an electrical output of activated electrical consumers located in the vehicle interior, and an input of heat through solar radiation and through an interior heating and ventilation device.

* * * * *